United States Patent
Laurichesse et al.

(10) Patent No.: US 12,544,339 B2
(45) Date of Patent: Feb. 10, 2026

(54) SEALING FLUID FOR SEALING CAPSULES

(71) Applicant: CAPSUGEL BELGIUM NV, Bornem (BE)

(72) Inventors: Stephanie Laurichesse, Illkirch-Graffenstaden (FR); Ljiljana Palangetic, Colmar (FR)

(73) Assignee: Capsugel Belgium NV, Bornem (BE)

( * ) Notice: Subject to any disclaimer, the term of this patent is extended or adjusted under 35 U.S.C. 154(b) by 461 days.

(21) Appl. No.: 18/257,002

(22) PCT Filed: Dec. 13, 2021

(86) PCT No.: PCT/EP2021/085468
§ 371 (c)(1),
(2) Date: Jun. 12, 2023

(87) PCT Pub. No.: WO2022/128905
PCT Pub. Date: Jun. 23, 2022

(65) Prior Publication Data
US 2024/0041780 A1  Feb. 8, 2024

(30) Foreign Application Priority Data

Dec. 14, 2020 (EP) .................................... 20213865
Dec. 16, 2020 (EP) .................................... 20214456
Jan. 8, 2021 (EP) .................................... 21150730
Aug. 17, 2021 (EP) .................................... 21191714

(51) Int. Cl.
*A61K 9/48* (2006.01)

(52) U.S. Cl.
CPC .......... *A61K 9/4858* (2013.01); *A61K 9/4808* (2013.01); *A61K 9/4833* (2013.01)

(58) Field of Classification Search
CPC ... A61K 9/4858; A61K 9/4808; A61K 9/4833
See application file for complete search history.

(56) References Cited

U.S. PATENT DOCUMENTS

| | | | |
|---|---|---|---|
| 3,025,652 A * | 3/1962 | Ellsworth | A61J 3/072 53/390 |
| 11,246,837 B2 | 2/2022 | Straub et al. | |
| 2014/0360404 A1 | 12/2014 | He et al. | |
| 2015/0140084 A1 | 5/2015 | Takubo et al. | |
| 2018/0318171 A1 | 11/2018 | Tsaur et al. | |

FOREIGN PATENT DOCUMENTS

| | | | |
|---|---|---|---|
| CN | 106619128 B | 10/2017 | |
| EP | 0 180 543 A2 | 7/1986 | |
| WO | WO-2004103338 A1 * | 12/2004 | A61K 9/2886 |

OTHER PUBLICATIONS

International Search Report and Written Opinion dated Mar. 9, 2022, issued for International Patent Application No. PCT/EP2021/085468, 9 pages.
Office Action for Japanese Application No. 2023-535815, mailed Oct. 28, 2025.

* cited by examiner

*Primary Examiner* — Jeffrey S Lundgren
*Assistant Examiner* — Ibrahim D Bori
(74) *Attorney, Agent, or Firm* — Klarquist Sparkman, LLP

(57) ABSTRACT

The present invention discloses a sealing fluid comprising an organic acid, an alcohol and optionally water, the organic acid is lactic acid or acetic acid, the alcohol is isopropanol or ethanol, the sealing fluid is a liquid composition for sealing telescopically joined hard capsules with coaxial partly overlapping body parts.

20 Claims, No Drawings

SEALING FLUID FOR SEALING CAPSULES

CROSS REFERENCE TO RELATED APPLICATIONS

This is the U.S. National Stage of International Application No. PCT/EP2021/085468, filed Dec. 13, 2021, which was published in English under PCT Article 21 (2), which in turn claims the benefit of European Application No. 21191714.1, filed Aug. 17, 2021, European Application No. 21150730.6, filed Jan. 8, 2021, European Application No. 20214456.4, filed Dec. 16, 2020, and European Application No. 20213865.7, filed Dec. 14, 2020, each of which is incorporated herein in its entirety.

FIELD

The present invention discloses a sealing fluid comprising an organic acid, an alcohol and optionally water, the organic acid is lactic acid or acetic acid, the alcohol is isopropanol or ethanol, the sealing fluid is a liquid composition for sealing telescopically joined hard capsules with coaxial partly overlapping body parts.

BACKGROUND OF THE INVENTION

Capsules are well known dosage forms for pharmaceuticals, nutraceuticals, dietary supplement ingredients and the like. A hard capsule normally consists of a shell filled with one or more substances. A hard capsule shell consists of two parts, a cap and a body, both have cylindrical shape with an open end and a close end; the outer diameter of the cylindrical open end of the body fits telescopically into the inner diameter of the cylindrical open end of the cap. Once the capsule, that is the body, has been filled with the content of the capsule, the capsule is closed, for closing the capsule the open end of the body is telescopically inserted into the open end of the cap.

Hard capsules are generally manufactured by using a dip molding process, a mold pin is dipped into a melt, which is a liquid film forming composition comprising a dissolved film forming polymer. After extraction a film forms on the mold pin. The film is stripped from the mold pin; the dip molding is done separately to manufacture the cap and the body.

So in the closed capsule the cylindrical open end of the cap partly overlaps with the cylindrical open end of the body, that is part of the inner cylindrical surface of the cap is in contact with part of the outer cylindrical surface of the body. Between these overlapping surfaces of the cap and the body leakage may occur, since for various reasons the match of the inner diameter of the cap and the outer diameter of the body cannot be so exact and tight that any leakage is prevented, for example when the body is inserted into the cap when closing the respective air volume in the cap needs to escape, otherwise an overpressure may build up which may prevent a complete closing or even destroy the capsule; also the forces which need to be applied for sliding the cap over the body must not be too great in order to avoid damage of the cap or the body when closing. So there is always some tolerance between the cap and the body resulting in a slit between the overlapping parts of the cap and the body.

Once the capsule is closed, the beginning of this slit between the rim of the cap and the surface of the body is visible and approachable.

In some cases it is desired to avoid leakage of the content from the capsule, for example when the capsule is filled with a liquid substance. For this purpose the capsule is sealed, that is the slit between the cap and the body is closed be sealing. This sealing can also be viewed as a gluing or a bonding of the cap and the body to each other by means of a sealing fluid. When sealing the capsule the sealing fluid is applied onto the beginning of this slit between the rim of the cap and the surface of the body. By capillary action the sealing fluid is then spread and distributed into the inside of the slit. Capsule shells may be made of a variety of film forming polymers such as gelatin, HPMC, pullulan or starch. In case of HPMC there are two principally different methods for forming the film on the mold pin in the dip molding process: conventional gelation of HPMC at temperatures below the gelling temperature of a melt of HPMC requires in the melt the presence of a gelling system such as gellan; whereas thermal gelation occurs at temperatures above the gelation temperature of a melt of HPMC and does not require the presence of an additional gelling system in the melt.

WO 2004/103338 A1 discloses in Example 6 consisting of HPMC E50/water/lactic acid/propan-2-ol in the ratio 6/25/44/25 (total 100 parts). The viscosity is far too high to allow its use for sealing of capsules immediately after filling of the capsules in a conventional capsule filling machine at a rate compatible with conventional capsule filling lines. The viscosity does not allow to form a spray and it prohibits that the sealing fluid is everywhere in the sealing zone, which means higher leakage rate.

The problem to be solved was to provide a sealing fluid which is usable in automated sealing machines for automatized sealing of capsules, so large scale bulk production to reduce manufacturing time and costs and to reduce waste due to imperfection of the product should be possible. The sealing fluid should enable sealing of capsules immediately after filling of the capsules at a rate compatible with conventional capsule filling lines. Also no problems such as clogging should occur.

The sealing fluid should provide for an effective seal of the filled capsules in order to avoid leakage of any content, so a low leakage rate is desired. The sealing fluid should not have a detrimental effect on shape, dimension or stability of the capsule. The sealing fluid should be applicable to all kinds of capsule, especially to capsules with a combination of HPMC as film forming polymer and gellan as gelling system, that is to capsule shells made of HPMC and gellan as main or even sole components of the capsule shell.

The problem is solved with a sealing composition comprising an organic acid and an alcohol and optionally water.

Abbreviations and Definitions Used in this Specification

HPMC hydroxypropyl methylcellulose, also called hypromellose or Cellulose, 2-hydroxypropyl methyl ether or cellulose hydroxypropyl methyl ether, CAS 9004-65-3

SUMMARY OF THE INVENTION

Subject of the invention is a sealing fluid SEALFLU for sealing hard capsules comprising an organic acid ORGACID and an alcohol ALC;

ORGACID is lactic acid or acetic acid;

ALC is isopropanol or ethanol;

wherein the amount of ORGACID is at least 32.5 wt %;

the amount of ALC is at least 17.5 wt %;

the wt % being based on the weight of SEALFLU;

SEALFLU does not contain HPMC;

SEALFLU has a viscosity of 100 mPa*s or below, with the viscosity measured at 22° C. with a rotational viscometer with a cylindrical spindle.

DETAILED DESCRIPTION OF THE INVENTION

In one embodiment, SEALFLU does not contain any polymer which is conventionally used in the preparation of capsules, such as gelatin, pullulan, starch, modified starch, or cellulose derivatives such as HPMC.

More preferably, SEALFLU does not contain any polymer.

More preferably, SEALFLU does not contain any gelation agent.

More preferably, SEALFLU does not contain any substance that increases by its addition the viscosity of SEALFLU, in particular not over 100 mPa*s, with the viscosity measured at 22° C. with a rotational viscometer with a cylindrical spindle.

Preferably, the amount of ALC is at least 20 wt %; more preferably at least 25 wt %, even more preferably at least 30 wt %, especially at least 35 wt %, the wt % being based on the weight of SEALFLU.

Preferably, the amount of ALC is not more than 55 wt %, more preferably not more 50 wt %, even more preferably not more 45 wt %, the wt % being based on the weight of SEALFLU.

Any of the lower limits may be combined with any of the upper limits of the possible amounts of ALC.

Preferably, the amount of ORGACID is at least 35 wt %, the wt % being based on the weight of SEALFLU.

Preferably, the amount of ORGACID is not more than 75 wt %, more preferably at least 70 wt %, even more preferably not more 65 wt %, especially not more than 60 wt %, more especially not more than 55 wt %, even more especially not more than 50 wt %, in particular not more than 45 wt %, the wt % being based on the weight of SEALFLU.

Any of the lower limits may be combined with any of the upper limits of the possible amounts of ORGACID.

Any of the lower or upper limits of the possible amounts of ALC may be combined with any of the lower or upper limits of the possible amounts ORGACID.

In one embodiment, SEALFLU consists of ORGACID and ALC;
preferably ORGACID is acetic acid; or
preferably ALC is isopropanol;
more preferably in this case ORGACID is acetic acid and ALC is isopropanol.

In one embodiment, SEALFLU consists of ORGACID and ALC; ORGACID is acetic acid;
the amount of acetic acid is from 47.5 to 80 wt % and the amount of ALC is from 20 to 52.5 wt %,
preferably the amount of acetic acid is from 47.5 to 75 wt % and the amount of ALC is from 25 to 52.5 wt %;
the wt % being based on the weight of SEALFLU;
preferably, ALC is isopropanol.

In one embodiment, SEALFLU comprises besides ORGACID and ALC also water;
the sum of the amounts of ORGACID, ALC and water are at least 97.5 wt %, preferably 98 wt %, more preferably at least 99 wt %, even more preferably it is 100 wt %, that is SEALFLU consists of ORGACID, ALC and water, with the wt % being based on the weight of SEALFLU.

Preferably, when SEALFLU comprises besides ORGACID and ALC also water, then the amount of water in SEALFLU is at least 17.5 wt %, with the wt % being based on the weight of SEALFLU; preferably in this case ORGACID is lactic acid.

In one embodiment, SEALFLU comprises besides ORGACID and ALC also water; ORGACID is acetic acid;
the amount of acetic acid is from 40 to 60 wt %;
the amount of ALC is from 20 to 40 wt %;
the sum of the amounts of ORGACID, ALC and water are at least 97.5 wt %, preferably 98 wt %, more preferably at least 99 wt %, even more preferably the sum of the amounts of ORGACID, ALC and water is 100 wt %, that is SEALFLU consists of ORGACID, ALC and water;
the wt % being based on the weight of SEALFLU;
preferably ALC is isopropanol.

In one embodiment, SEALFLU comprises besides ORGACID and ALC also water; ORGACID is acetic acid;
the amount of acetic acid is from 45 to 55 wt %;
the amount of ALC is from 25 to 35 wt %;
the sum of the amounts of ORGACID, ALC and water are at least 97.5 wt %, preferably 98 wt %, more preferably at least 99 wt %, even more preferably the sum of the amounts of ORGACID, ALC and water is 100 wt %, that is SEALFLU consists of ORGACID, ALC and water;
the wt % being based on the weight of SEALFLU;
preferably ALC is isopropanol.

In one embodiment, SEALFLU comprises besides ORGACID and ALC also water;
ORGACID is lactic acid;
the amount of lactic acid is from 32.5 to 62.5 wt %;
the amount of ALC is from 17.5 to 47.5 wt %;
the sum of the amounts of ORGACID, ALC and water are at least 97.5 wt %, preferably 98 wt %, more preferably at least 99 wt %, even more preferably the sum of the amounts of ORGACID, ALC and water is 100 wt %, that is SEALFLU consists of ORGACID, ALC and water;
preferably ALC is ethanol and the amount of ethanol is from 25 to 42.5 wt %, more preferably from 27.5 to 42.5 wt %;
the wt % being based on the weight of SEALFLU.

In one embodiment, SEALFLU comprises besides ORGACID and ALC also water; ORGACID is lactic acid;
the amount of lactic acid is from 32.5 to 55 wt %;
the amount of ALC is from 17.5 to 42.5 wt %;
the sum of the amounts of ORGACID, ALC and water are at least 97.5 wt %, preferably 98 wt %, more preferably at least 99 wt %, even more preferably the sum of the amounts of ORGACID, ALC and water is 100 wt %, that is SEALFLU consists of ORGACID, ALC and water;
preferably, ALC is ethanol and the amount of ethanol is from 25 to 42.5 wt %, more
preferably from 27.5 to 42.5 wt %;
the wt % being based on the weight of SEALFLU.

In one embodiment, SEALFLU comprises besides ORGACID and ALC also water;
ORGACID is lactic acid and ALC is isopropanol;
the amount of lactic acid is from 37.5 to 55 wt %;
the amount of isopropanol is from 17.5 to 42.5 wt %;
the sum of the amounts of ORGACID, ALC and water are at least 97.5 wt %, preferably 98 wt %, more preferably at least 99 wt %, even more preferably the sum of the amounts of ORGACID, ALC and water is 100 wt %, that is SEALFLU consists of ORGACID, ALC and water;
the wt % being based on the weight of SEALFLU.

In one embodiment, SEALFLU comprises besides ORGACID and ALC also water;
ORGACID is lactic acid and ALC is isopropanol;
the amount of lactic acid is from 37.5 to 45 wt %;
the amount of isopropanol is from 35 to 42.5 wt %,
the sum of the amounts of ORGACID, ALC and water are at least 97.5 wt %, preferably 98 wt %, more preferably at least 99 wt %, even more preferably the sum of the amounts of ORGACID, ALC and water is 100 wt %, that is SEALFLU consists of ORGACID, ALC and water;
the wt % being based on the weight of SEALFLU.

In one embodiment, SEALFLU consists of ORGACID and ALC and water;
preferably, ORGACID is lactic acid; or
preferably, ALC is isopropanol;
more preferably, ORGACID is lactic acid and ALC is isopropanol.

In one embodiment, SEALFLU consists of ORGACID and ALC and water;
the amount of ORGACID is 40 wt %,
the amount of ALC is 40 wt %,
the wt % being based on the weight of SEALFLU;
preferably, ORGACID is lactic acid; or
preferably, ALC is isopropanol;
more preferably, ORGACID is lactic acid and ALC is isopropanol.

Any water may be demineralized water.

SEALFLU may have a viscosity of 100 mPa*s or below, preferably of 75 mPa*s or below, more preferably of 60 mPa*s or below, even more preferably of 50 mPa*s or below, especially of 45 mPa*s or below, more especially of 40 mPa*s or below, with the viscosity measured at 22° C. with a rotational viscometer with a cylindrical spindle.

In one embodiment, SEALFLU has a viscosity which is equal or lower than the viscosity of pure lactic acid, with the viscosity measured at 22° C. with a rotational viscometer with a cylindrical spindle.

Further subject of the invention is a method of preparation of SEALFLU, wherein ORGACID and ALC and any water are mixed;
with SEALFLU, ORGACID and ALC as defined herein, also with all their embodiments.

The mixing of ORGACID, ALC and water can be done in any order.

Further subject of the invention is a method, METHSEAL, for sealing a hard capsule, the capsule shell of the capsule consists of a cap and a body with the body being telescopically inserted into the cap providing a slit between the overlapping parts of the cap and the body; wherein the sealing is done by applying SEALFLU onto said slit;
with SEALFLU as defined herein, also with all its embodiments.

The capsule is filled and closed before the sealing. When closing the capsule cap and the body are telescopically joined. This joining can be done for example by inserting the body into the cap, that is the body slides into the cap, or the other way around. The cap and the body partly overlap in the closed capsule. Thereby a slit is formed between the overlapping parts of the cap and the body. When sealing the capsule the sealing fluid is applied onto the slit, that is onto the beginning of this slit which is approachable from the outside of the capsule. The beginning of the slit is located between the rim of the cap and the surface of the body.

SEALFLU may be uniformly around the capsule, thereby also onto the slit, or it may be applied onto the slit only. SEALFLU may be applied onto the slit over the whole length of the slit or only to a part or to parts of the length of the slit. Preferably it is applied over the whole length of the slit.

SEALFLU may be applied by spraying onto the slit or onto the capsule and thereby also onto the slit.

SEALFLU may have ambient temperature or a temperature below ambient temperature when it is applied onto the capsule, that is onto the slit.

After the application of SEALFLU onto the slit the capsule may be dried. This drying may for example be done to remove any excess of SEALFLU. It may also be done to ensure that the surfaces of the overlapping parts of the cap and the body, that is the surfaces of the cap and the body that form the slit, securely bond to each other.

Further subject of the invention is a sealed capsule obtainable by the method METHSEAL; with METHSEAL as defined herein, also with all its embodiments.

Capsules suitable for the method for sealing a hard capsule of the present invention may have a shell made out of known film forming polymers such as gelatin, HPMC, pullulan or starch. The capsule shell may comprise further components such as a gelling system, a typical gelling system is gellan. In one embodiment the method for sealing a hard capsule of the present invention is a method for sealing hard capsules wherein the film forming polymer of the capsule shell is gelatin, HPMC, pullulan or starch, in one embodiment the film forming polymer is HPMC and the capsule shell contains gellan. The amount of gellan in the capsule shell may be from 0.01 to 10 wt %, preferably 0.01 to 7 wt %, more preferably 0.1 to 7 wt %, even more preferably from 1 to 7 wt %, especially from 3 to 6 wt %, more especially from 4 to 6 wt %, the wt % being based on the weight of HPMC.

EXAMPLES

Materials and Abbreviations capsules in the examples DRcaps® Capsules of Capsugel, now a Lonza company, Lonza Ltd, Basel, Switzerland, were used, DRcaps® capsules have a HPMC based formulation with gellan gum, DRcaps® capsules have delayed release properties. The capsules had the Licaps® capsule design of Capsugel, now a Lonza company, Lonza Ltd, Basel, Switzerland.
CFS Capsule Filling and Sealing
CFS 1200 CFS 1200™ of Capsugel, now a Lonza company, Lonza Ltd, Basel,
Switzerland, is a CFS machine for lab and pilot plant scale operation, operating speed of ca. 1'200 capsules per hour. The CFS operates with three steps: filling—sealing—drying. Drying is done by blowing air of a predefined temperature.
HPMC hydroxypropyl methylcellulose, also called hypromellose or Cellulose, 2-hydroxypropyl methyl ether or cellulose hydroxypropyl methyl ether, CAS 9004-65-3
IPA aqueous isopropanol 80 wt %
lactic acid (S)-Lactic acid about 90%, EMPROVE® EXPERT Ph Eur,BP,E 270, Merck KGaA, Darmstadt, Germany
Technical Data sheet of Lactic acid 90% from Merck: 20 to 40 mPa*s at 20° C. Lactic acid viscosity (literature): 37 to 39 mPa*s at ambient temperature
21.2 mPa*s at 35° C.
LEMS Liquid Encapsulation Microspray Sealing
LEMS 70 LEMS®70 is a LEMS System of Capsugel, now a Lonza company, Lonza Ltd, Basel, Switzerland, a CFS machine for production scale operation, operating speed of up to 55'000 capsules per hour, capsule size range: sizes 000, 00e1, 00, Oe1, 0, 1. 2, 3, 4 rpm rounds per minute (A) Sealing Fluid: A Solution 40/40/20 (w/w/w) of Lactic Acid/Isopropanol/Water Sealing Fluid (A1)

For 100 g of sealing fluid solution:

44.44 g of lactic acid 50 g of IPA 5.56 g of demineralized water

Sealing fluid solutions was prepared by adding the three component following this order: Lactic acid, water and then IPA. The solution is then mixed with a magnetic stirrer.

The sealing fluid was used at ambient temperature to seal capsules.

(B) General Description of the Sealing

Two different sealing machines were used, the CFS 1200 and the LEMS 70.

CFS 1200 was used at a speed of ca. 1200 capsules per hour.

LEMS was used at a speed of ca. 40'000 capsules per hour.

Capsules of size 0 were used in the examples.

(C) Leak Rate Detection

Sealed capsules were spread out on white paper sheets on trays and stored overnight (ca. 12 h) at ambient temperature and ambient pressure.

Then the trays were put into a vacuum chamber and vacuum of 250 mbar was applied in the vacuum chamber for 20 min. Thereafter the trays were taken out of the vacuum chamber and the capsules were then visually inspected on a light table to observe potential leaks which show as oily stains spread out under a leaking capsule in the paper sheet. Leak rate is given as % of leaking capsules of the total amount of capsules tested for leaking. The capsules may have been left on the paper sheets on the trays for 1 week and another determination of the leak rate by visual inspection may have been done.

In case of lab scale operation, such as on CFS 1200, leak rates of 0.5% or below are acceptable.

In case of pilot plant scale/production scale operation, such as on LEMS, leak rates of 0.05% or below are acceptable (D) Viscosity Apparatus to Measure Viscosity:

Viscosimeter BROOKFIELD DV-II+, AMETEK Brookfield, Middleboro, MA, USA, with Chamber SC4-13R and cylindrical spindle 18.

Temperature chamber has to be regulated by a water bath at 22° C.±0.1° C.

Sealing fluid is introduced with a syringe in order to fill half of the viscosity chamber.

Then the spindle is introduced and chamber is completely filled up with the sealing fluid up to 1 mm from the rim. The absence of bubbles is checked to avoid error for viscosity measurement.

Viscosimeter speed is chosen to be the highest as possible to have the best measurement precision.

Viscosity is measured after 10 min.

Viscosity value=mean of 2 measurements

Details are given in table 6 and table 7.

TABLE 6

| Viscosity Brookield at 22° C., Spindle 18 | Viscosity [mPa * s] | Speed [rpm] |
| --- | --- | --- |
| Sealing Fluid (A1) Lactic Acid/isopropanol/$H_2O$ 40/40/20 (w/w/w) | 9.1 +/− 2.9 | 100 |
| WO 2004/103338 A1 Example 6: HPMC E50    6 parts by weight $H_2O$         25 parts by weight Lactic acid   44 parts by weight Propan-2-ol  25 parts by weight | 14 820 | 0.3 |
| Total          100 parts by weight | | |

TABLE 7

| (1) I | II | III | I [wt %] | II [wt %] | III [wt %] | Viscosity [mPa*s] |
| --- | --- | --- | --- | --- | --- | --- |
| acetic acid | isopropanol | — | 70 | 30 | | 2.8 |
| acetic acid | isopropanol | — | 50 | 50 | | 2.85 |
| acetic acid | isopropanol | $H_2O$ | 50 | 30 | 20 | 3.7 |
| lactic acid | isopropanol | $H_2O$ | 40 | 30 | 30 | 7.05 |
| lactic acid | isopropanol | $H_2O$ | 40 | 20 | 40 | 6.25 |
| lactic acid | isopropanol | $H_2O$ | 50 | 20 | 30 | 8.05 |
| lactic acid | EtOH | $H_2O$ | 50 | 30 | 20 | 6.9 |
| lactic acid | EtOH | $H_2O$ | 40 | 36 | 24 | 5.6 |
| lactic acid | EtOH | $H_2O$ | 35 | 39 | 26 | 5.1 |

(1) Viscosity Brookield at 22° C., Spindle 18, speed 100 rpm

Example 1—Sealing with CFS 1200

(1a) Filling with Oil

Capsules were filled in CFS 1200 with peanut oil. The viscosity of the peanut oil was very low (74.9 mPa*s at 22° C.—Brookfield viscosity) which is especially prone to leak and therefore a good model for leak rate detection. Each capsule was filled with the same amount of oil. Capsules were then closed and were moved to the sealing position in and by the CFS 1200.

(1b) Sealing

Each capsule was sealed on CFS 1200 with 20 mg of sealing fluid per capsule, the sealing fluid having been prepared according to (A1), the sealing fluid was sprayed around the outward and open end of the gap provided by the overlap of the telescopically joined cap and body of the capsule.

No problems such as clogging of the sealing machine was observed.

(1c) Drying

Drying temperature in the CFS 1200 was 25° C.

(1d) Results

Leak Rate Detection was done according to (C). Results are shown in Table 1.

Before the vacuum chamber no leaks were detected.

TABLE 1

| | Leak Rate [%] | |
| --- | --- | --- |
| Number of capsules sealed | After vacuum chamber | after 1 week |
| 1062 | 0.0 | 0.0 |

The dimension, shape and stability of the capsules was not affected by the sealing.

Example 2—Sealing with LEMS 70

(2a) Filling with Oil

Capsules were filled with sunflower oil. The viscosity of the sunflower oil was very low (53 mPa*s at 22° C.—Brookfield viscosity) which is especially prone to leak and therefore a good model for leak rate detection. Each capsule was filled with the same amount of oil. Capsules were then closed.

(2b) Sealing

Each capsule was sealed in the LEMS 70 with 25 mg of sealing fluid per capsule, the sealing fluid having been prepared according to (A1), the sealing fluid was sprayed onto the capsule including spraying around the outward and open end of the gap provided by the overlap of the telescopically joined cap and body of the capsule.

No problems such as clogging of the sealing machine was observed.

(2c) Drying

Drying temperature in the LEMS 70 was 35° C.

(2d) Results

Leak Rate Detection was done according to (C). Results are shown in Table 2.

Before the vacuum chamber no leaks were detected.

TABLE 2

| Run | Number of capsules sealed | Leak Rate [%] After vacuum chamber |
|---|---|---|
| 1 | 12 492 | 0.00% |
| 2 | 30 186 | 0.02% |
| 3 | 32 490 | 0.01% |
| 4 | 30 375 | 0.01% |
| 5 | 32 800 | 0.03% |
| 6 | 30 609 | 0.01% |
| 7 | 33 066 | 0.01% |

7 repetitive runs resulted repeatedly in acceptable and comparable Leak Rates.

The dimension, shape and stability of the capsules was not affected by the sealing.

Example 3

Example 1 was repeated with the details given in tables 3 to 5. The sealing fluids were prepared according to (A) with the compositions given in the tables 3 to 5. Sealing was done with a CFS 1200 according to (B) and leak rate detection was done according to (C).

In each run no leaks were observed before the vacuum chamber.

No problems such as clogging of the sealing machine was observed.

All runs show acceptable leak rates.

The dimension, shape and stability of the capsules was not affected by the sealing.

TABLE 3

| Run | Sealing fluid (A2) Acetic acid/ isopropanol (w/w) | Number of capsules sealed | Leak Rate [%] After vacuum chamber | after 1 week |
|---|---|---|---|---|
| 3-20 | 70/30 | 443 | 0.2% | N/A |
| 3-21 | 50/50 | 105 | 0% | N/A |

TABLE 4

| Run | Sealing fluid (A3) (A3) Lactic acid/ EtOH/H₂O (w/w/w) | Number of capsules sealed | Leak Rate [%] After vacuum chamber | after 1 week |
|---|---|---|---|---|
| 3-30 | 50/30/20 | 1212 | 0.0 | 0.0 |
| 3-31 | 40/36/24 | 573 | 0.0 | 0.0 |
| 3-32 | 35/39/26 | 557 | 0.0 | 0.0 |

TABLE 5

| Run | Sealing fluid (A4) Lactic acid/ isopropanol/H₂O (w/w/w) | Number of capsules sealed | Leak Rate [%] After vacuum chamber | after 1 week |
|---|---|---|---|---|
| 3-40 | 40/30/30 | 475 | 0.2 | 0.2 (1) |
| 3-41 | 40/20/40 | 549 | 0.2 | 0.2 (1) |
| 3-42 | 50/20/30 | 1065 | 0.2 | 0.2 (1) |

(1) no additional leak after one week, that means the leak rate remains the same

The invention claimed is:

1. A hard capsule sealing fluid comprising, based on the weight of the sealing fluid:
    a) at least 32.5 wt % of an organic acid selected from lactic acid or acetic acid; and
    b) at least 17.5 wt % of an alcohol selected from isopropanol or ethanol, wherein
    the sealing fluid does not contain hydroxypropyl methylcellulose (HPMC); and
    the sealing fluid has a viscosity of ≤100 mPa*s, with the viscosity measured at 22° C. using a rotational viscometer with a cylindrical spindle.

2. The sealing fluid according to claim 1, wherein the sealing fluid consists of the organic acid and the alcohol.

3. The sealing fluid according to claim 2, wherein the organic acid is acetic acid.

4. The sealing fluid according to claim 2, wherein the alcohol is isopropanol.

5. The sealing fluid according to claim 3, wherein based on the weight of the sealing fluid:
    a) the acetic acid is in an amount ranging from 47.5 wt % to 80 wt %; and
    b) the alcohol is an amount ranging from 20 wt % to 52.5 wt %.

6. The sealing fluid according to claim 1, further comprising water, wherein based on the weight of the sealing fluid, the sum of the amounts of the organic acid, the alcohol and water is at least 97.5 wt %.

7. The sealing fluid according to claim 6, wherein based on the weight of the sealing fluid, the water is in an amount of at least 17.5 wt %.

8. The sealing fluid according to claim 6, wherein based on the weight of the sealing fluid:
    a) the organic acid is acetic acid and is in an amount ranging from 40 wt % to 60 wt %; and
    b) the alcohol is an amount ranging from 20 wt % to 40 wt %.

9. The sealing fluid according to claim 8, wherein the alcohol is isopropanol.

10. The sealing fluid according to claim 6, wherein based on the weight of the sealing fluid:
    a) the organic acid is lactic acid and is in an amount ranging from 32.5 wt % to 62.5 wt %; and
    b) the alcohol is an amount ranging from 17.5 wt % to 47.5 wt %.

11. The sealing fluid according to claim 10, wherein based on the weight of the sealing fluid, the alcohol is ethanol and is in an amount ranging from 25 wt % to 42.5 wt %.

12. The sealing fluid according to claim 10, wherein based on the weight of the sealing fluid:
   a) the lactic acid is in an amount ranging from 37.5 wt % to 55 wt %; and
   b) the alcohol is isopropanol and is an amount ranging from 17.5 wt % to 42.5 wt %.

13. The sealing fluid according to claim 12, wherein based on the weight of the sealing fluid:
   a) the lactic acid is in an amount ranging from 37.5 wt % to 45 wt %; and
   b) the isopropanol is an amount ranging from 35 wt % to 42.5 wt %.

14. The sealing fluid according to claim 6, wherein the sealing fluid consists of the organic acid, the alcohol, and water.

15. The sealing fluid according to claim 14, wherein the organic acid is lactic acid.

16. The sealing fluid according to claim 14, wherein the alcohol is isopropanol.

17. The sealing fluid according to claim 6, wherein based on the weight of the sealing fluid:
   a) the organic acid is in the amount of 40 wt %; and
   b) the alcohol is the amount of 40 wt %.

18. A method of preparing the sealing fluid of claim 1, comprising mixing the organic acid and the alcohol.

19. A method for sealing a hard capsule comprising applying the sealing fluid of claim 1 to the capsule.

20. A sealed hard capsule obtainable by the method of claim 19.

* * * * *